June 10, 1930.  A. PREEDIT  1,762,455

ELECTRIC MACHINE

Filed Jan. 2, 1929

Anton Preedit
INVENTOR.

BY
ATTORNEYS.

Patented June 10, 1930

1,762,455

UNITED STATES PATENT OFFICE

ANTON PREEDIT, OF ERIE, PENNSYLVANIA, ASSIGNOR TO ARMOR ELECTRIC MANUFACTURING COMPANY, OF ERIE, PENNSYLVANIA, A CORPORATION OF PENNSYLVANIA

ELECTRIC MACHINE

Application filed January 2, 1929. Serial No. 329,810.

Electric machines, such as generators and motors, generate heat and as it is desirable to enclose these machines as far as possible in order to exclude dust and assure more perfect running the disposition of this heat becomes a problem. The present invention is designed to improve electric machines, particularly enclosed machines with relation to dissipating the heat from such machines. Features and details of the invention will appear from the specification and claims.

A preferred embodiment of the invention is illustrated in the accompanying drawings as follows:—

Figure 1:
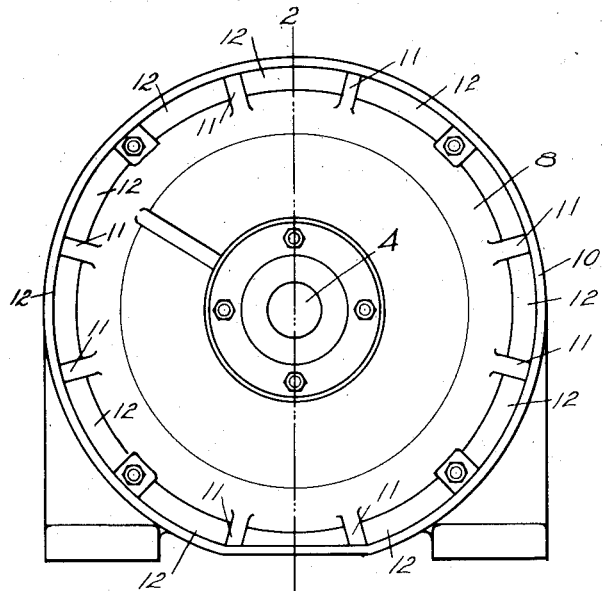

Fig. 1 shows an end view of a machine.

Figure 2:
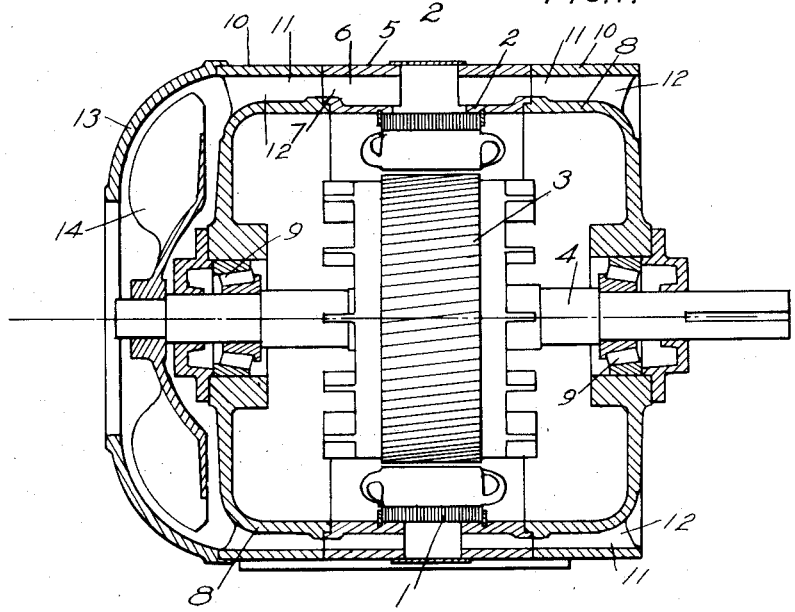

Fig. 2 a section on the line 2—2 in Fig. 1.

1 marks the stator, 2 the stator housing, 3 the rotor and 4 the rotor shaft. These may be of any usual construction. The housing is surrounded by a shell 5 which is ordinarily connected with the housing by spacer ribs 6, the shell, housing and ribs being ordinarily an integral casting. The space between the housing and shell forms a circulating air passage 7.

Brackets 8 are arranged at each end of the machine forming a joint with the housing and carrying bearings 9 for the rotor shaft. These brackets are formed with an outer wall 10 which is connected with the inner wall, or bracket proper 8 by heat conducting posts 11, the space between the walls and between the posts forming air passages 12, these air passages registering with the air passages 7. A fan housing, or cover 13 is secured to one of the brackets and a fan 14 arranged on the end of the shaft 4, the fan driving the air through the passages and absorbing heat from the walls of the passage, some of the heat from the inner walls being conveyed to the outer wall by means of the ribs and posts and dissipated to the air through the outer wall. These bridge pieces, or posts also increase the surface wiped by the air and also, therefore, assist in dissipating heat to the air.

What I claim as new is:—

1. In an electric machine, the combination of a stator; a stator housing; a rotor within the stator; an air circulating case over the housing forming air passages through the housing; and an end bracket on the housing, said bracket having an inner wall and an outer wall extending radially outside and axially along the inner wall with an intervening space forming an air circulating passage connecting with the passage in the housing, said bracket walls being connected by radially extending heat conducting posts.

2. In an electric machine, the combination of a stator; a stator housing; a rotor within the stator; an air circulating case over the housing forming air passages through the housing; and an end bracket at each end of the housing, said bracket having an inner wall and an outer wall extending radially outside and axially along the inner wall with an intervening space forming an air circulating passage connecting with the passage in the housing, said bracket walls being connected by radially extending heat conducting posts.

3. In an electric machine, the combination of a stator; a stator housing; a rotor within the stator; an air circulating case over the housing forming air passages through the housing; an end bracket at each end of the housing, said bracket having an inner wall and an outer wall extending radially outside and axially along the inner wall with an intervening space forming an air circulating passage connecting with the passage in the housing, said bracket walls being connected by radially extending heat-conducting posts; a fan case extending from the outer wall of one of the brackets; and a fan in the case.

4. In an electric machine, the combination of a stator; a stator housing; a rotor within the stator; an air circulating case over the housing forming air passages through the housing; an end bracket on the housing, said bracket having an inner wall and an outer wall extending radially outside and axially along the inner wall with an intervening space forming an air circulating passage connecting with the passage in the housing, said bracket walls being connected by radially extending heat conducting posts; and fastening means between the posts connecting the bracket and housing.

5. In an electric machine, the combination of a stator; a stator housing; a rotor within the stator; an air circulating case over the housing forming air passages through the housing; and an end bracket on the housing, said bracket having an inner wall and an outer wall extending radially outside and axially along the inner wall with an intervening space forming an air circulating passage connecting with the passage in the housing, said bracket walls being connected by radially extending heat conducting integral posts.

In testimony whereof I have hereunto set my hand.

ANTON PREEDIT.